(No Model.) 2 Sheets—Sheet 1.

W. ESTY.
FRICTION CLUTCH.

No. 566,508. Patented Aug. 25, 1896.

Witnesses:
Albert B. Blackwood.
Jos. H. Blackwood.

Inventor.
William Esty
by Arthur H. Browne
his Attorney.

(No Model.) 2 Sheets—Sheet 2.
W. ESTY.
FRICTION CLUTCH.
No. 566,508. Patented Aug. 25, 1896.
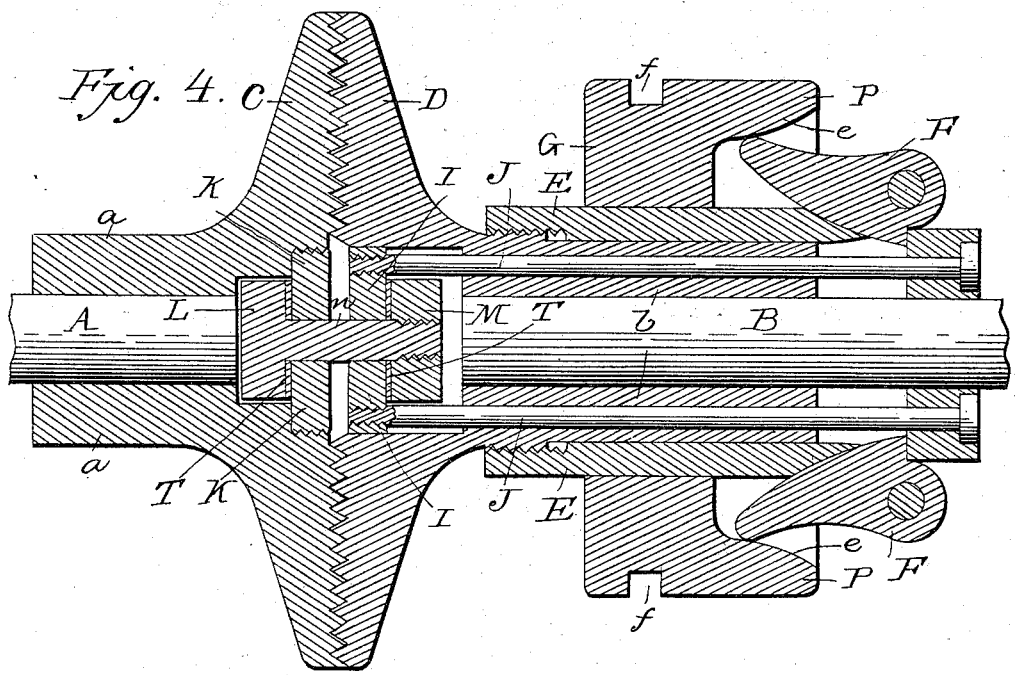
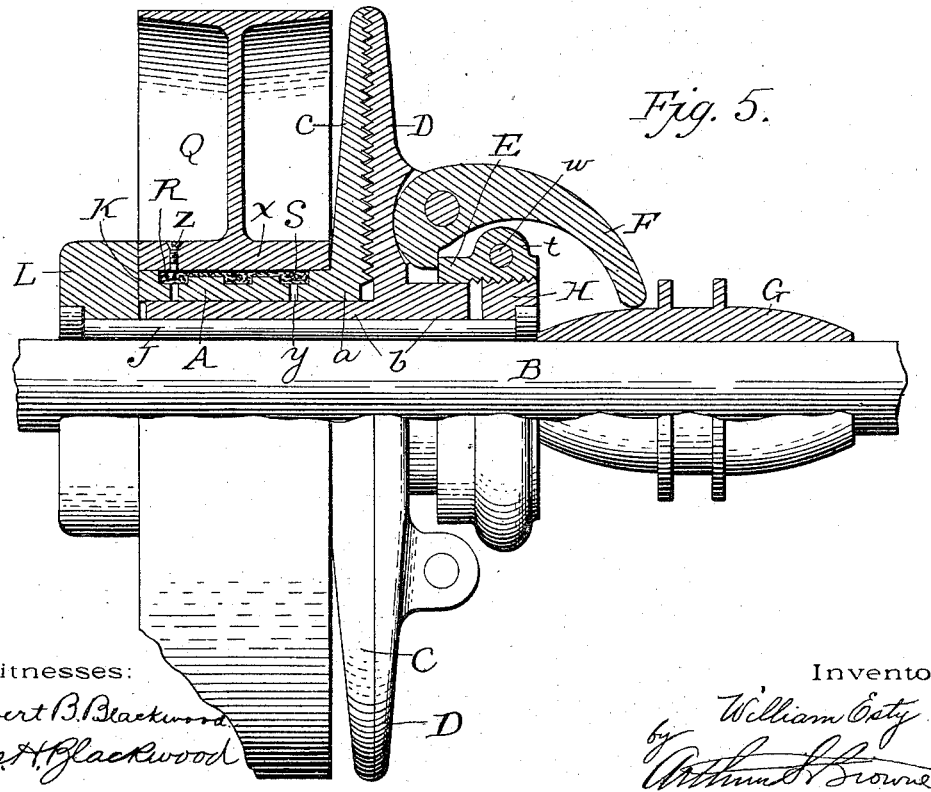
Witnesses:
Albert B. Blackwood
Jos. H. Blackwood
Inventor.
William Esty
by Arthur F. Browne
his Attorney.
THE NORRIS PETERS CO., PHOTO-LITHO., WASHINGTON, D. C.

# UNITED STATES PATENT OFFICE.

WILLIAM ESTY, OF LACONIA, NEW HAMPSHIRE.

FRICTION-CLUTCH.

SPECIFICATION forming part of Letters Patent No. 566,508, dated August 25, 1896.

Application filed May 4, 1895. Serial No. 548,088. (No model.)

*To all whom it may concern:*

Be it known that I, WILLIAM ESTY, of Laconia, in the county of Belknap and State of New Hampshire, have invented certain new and useful Improvements in Friction-Clutches, of which the following is a specification, reference being had to the accompanying drawings, wherein—

Figure 1:
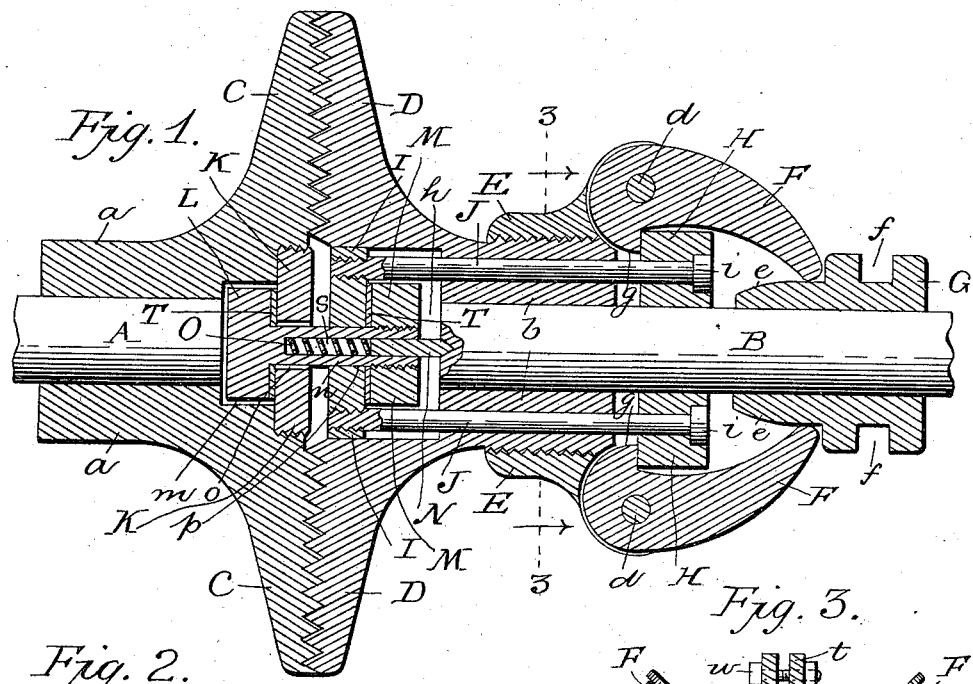
Figure 2:
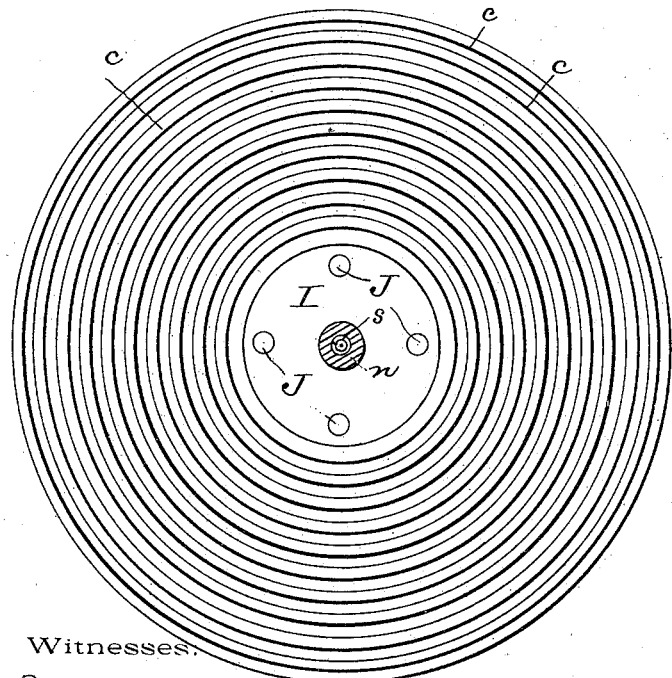
Figure 3:
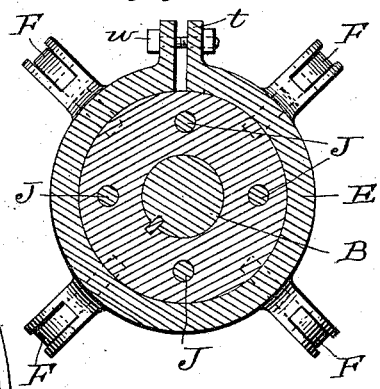

Figure 1 is a central longitudinal section through the improved clutch. Fig. 2 is a face view of one member of the clutch. Fig. 3 is a cross-section in a plane indicated by the line 3 3 in Fig. 1. Fig. 4 is a central longitudinal section of a modification of the clutch. Fig. 5 is a central longitudinal section of a second modification of the clutch.

Referring first to Figs. 1, 2, and 3, wherein is shown the improved embodiment of the clutch, A is the driving-shaft, which is constantly rotated by suitable connection with the source of power, and B is the driven shaft, which is suitably connected, directly or otherwise, with a dynamo-machine or other power user. The two shafts A and B are alined, their respective axes of rotation being in the same right line.

C and D are the two friction-clutch members, which are immovably connected with their respective shafts A and B by reason of their respective hubs $a$ and $b$ being keyed fast to said shafts, respectively, so that the clutch members rotate with their respective shafts and have no longitudinal movement thereupon. The longitudinal movement between the clutch members C and D necessary to effect the uncoupling or coupling of the driven shaft B is due to the longitudinal movement of one or both of the shafts A B (preferably the driven shaft B) in its bearings. Owing to the character and construction of the friction-surfaces, this longitudinal movement needs to be but slight, between, say, one-sixteenth and one-eighth of an inch. The abutting faces of the friction-clutch members are composed of a plurality of continuous grooves $c$, each of which is concentric with the axis of rotation. The intermediate ribs between the grooves of one clutch member are opposite and fit accurately within the grooves $c\ c$ of the other clutch member. Each groove in cross-section, as shown, has straight converging sides, which meet at an acute angle at the bottom of the groove, and each rib is correspondingly shaped and of the same size. By reason of this construction several advantages are apparent, among which may be mentioned, first, an extended frictional contact is secured; second, a slight separation of the two friction-faces suffices to uncouple the two shafts; third, the coupling is effected without any abruptness; and fourth, if any sudden load is thrown upon the power user the friction-faces can slip, thus avoiding breakage. Where such concentrically-grooved friction-faces are employed, it is important that the two shafts A and B should always maintain the coincidence of their common axis of rotation, so as to always maintain the concentric ribs of one clutch-face exactly opposite the concentric grooves of the opposite clutch-face during all positions of the clutch members, and hence the longitudinal or endwise movement between the two clutch members should be effected by squarely-acting instrumentalities, so as to avoid any distorting strains. For the accomplishment of these ends, the clutching and unclutching instrumentalities are as follows:

There is fastened to the hub $b$ of the clutch member D, so as to be immovable thereupon during the operation of the clutching and unclutching instrumentalities and during the rotation of the shafts A and B, a sleeve E, to which are pivoted at $d$ a plurality of dogs F F. These dogs are disposed symmetrically and at equal distances apart with reference to the axis of rotation, and are preferably four in number, ninety degrees apart. (See Fig. 3.) The free or outer ends of these dogs coöperate with the conical end $e$ of a clutch-sleeve G, which slides freely in a longitudinal direction upon the driven shaft B, and preferably is free to turn upon said shaft. This clutch-sleeve is provided, as usual, with a peripheral groove $f$, which coöperates with the fork of a shipper, which is not shown. As the clutch-sleeve slides back and forth upon the shaft B, the free ends of the dogs F F ride up and down upon the cone $e$, whereby said dogs are swung on their pivots $d$. The dogs are provided with heels $g\ g$, which (when the dogs are swung upwardly by the movement of the clutch-sleeve G toward them) abut against the adjacent face of a thrust-collar H, which surrounds the shaft B and is capable of sliding freely back and forth thereupon.

Located and fitted within an open annular recess $h$ at the middle of the clutch member (said recess being beyond the termination of the shaft B and having its peripheral wall concentric with the axis thereof) is a sliding disk I, which slides back and forth in said recess. This sliding disk I is rigidly connected with the thrust-collar H by means of a plurality of tie-rods J J. These tie-rods are disposed symmetrically and at equal distances apart with reference to the axis of rotation, and are preferably four in number, ninety degrees apart. (See Fig. 3.) These tie-rods extend and slide through suitably provided and constructed longitudinal channels or bores in the hub $b$ of the clutch member D. As shown in Fig. 1, each of these tie-rods J is a headed bolt tapping into the sliding disk I and having its head $i$ countersunk in the outer face of the thrust-collar H. As the result of the specified construction, the sliding disk I partakes of the movements imparted to the thrust-collar H by the dogs F.

Rigidly secured in a countersunk recess at the middle of the clutch member C is a stationary disk providing a shoulder-bearing K, with which coöperates a thrust-block L, which is located within a suitable recess $m$ in the hub $a$ of the clutch member C, said recess being beyond the termination of the shaft A. The thrust-block L moves freely back and forth within this recess between the end of the shaft A and the shoulder-bearing K. This thrust-block L has rigidly secured thereto a central stem $n$, (preferably made in one therewith,) which extends through central apertures $o$ $p$ (in block K and disk I, respectively) and terminates within the recess $h$ in the clutch member D, and the axis of the said stem being coincident (or substantially so) with the common axis of the two shafts A B.

Within the recess $h$, between the sliding disk I and the end of the shaft B, is located a bearing-block M, which is rigidly secured to the end of the stem $n$, as by screwing thereonto, as shown. The stem $n$ preferably passes through the aperture $p$ with a guiding fit, so that the axial alinement of the stem is insured. The bearing-block M, it will be noted, is wholly within the tie-rods J J and free therefrom. The stem $n$ and its two blocks L M, together with the disk I, collar H, and tie-rods J J, constitute a "clutch-connector," since they are the intermediary between the two clutch members. When, therefore, the thrust-collar is moved toward the clutch-sleeve G, the sliding disk I moves in the same direction, which in turn bears upon the bearing-block M, thereby moving said block and likewise the thrust-block in the same direction. The thrust-block is thus brought to bear upon the shoulder-bearing K, whereby the friction-faces are brought together, owing to the thrust of the dogs F F upon the clutch member D being in a direction opposite to that of the thrust-block L upon the clutch member C.

Since the movements of the several parts H, I, J, M, $n$, and L, constituting the clutch-connector, are parallel with the axis of rotation, since the bearing-block is centrally located, and since the several dogs F F are equally spaced and symmetrically arranged, the clutching friction-faces are always brought squarely together. The axial arrangement of the connecting-stem $n$ insures the axial alinement of the two shafts A and B and maintains the grooved friction-faces in proper relative position.

The section of the clutch-connector comprising the blocks L M and their connecting-stem $n$ is not attached to either shaft A or B or to either clutch member C or D by any positive connection, which is a matter of importance, since the shoulder-bearing K partakes always of the rotary movement of the shaft A and the disk I is sometimes rotary and sometimes stationary, and consequently the clutch-connector as a whole can adapt itself to the changing conditions in clutching and unclutching. The clutch-connector is thus seen to be composed of two members or sections having a sliding and rotatable connection between them. One of these members or sections is composed of the parts L $n$ M, and the other member or section is composed of the parts H I J. These two members are capable of rotation upon each other and of sliding upon each other. One of these sections or members, which may be called the "operator," includes the initial clutch-effecting device, that is, the thrust-collar H, which receives the thrust of the operating mechanism, whereas the other section or member, which may be called the "transmitter," includes the thrust-block which transmits the clutching force to the operated clutch member C. The clutch-connector as a whole is centrally located, and is inclosed so as to be protected from injury or disarrangement. In a broad sense it will be noted that the tie-rods connect the initial and terminal members H L of the clutch-connector.

The connector-stem $n$ of the transmitter passes through the aperture $o$ in the bearing K, a clear annular space existing, and since there is a guiding fit between the stem $n$ and the sliding disk I of the operator the transmitter should preferably adapt itself to the changing rotary movements of the operator. It is hence desirable that when the clutch members are separated to stop the power user the thrust-block should be moved out of contact with the continuously-rotating shoulder-bearing K, so as to avoid unnecessary wear upon the several parts of the clutch-connector and upon the bearing K. To this end the stem $n$ is provided with a longitudinal axial chamber $s$, in which freely fits a pin N, having a step-bearing on the center of the end of the shaft B. The pin N is always maintained bearing against the end of the shaft B by means of a spring O within said chamber s. As a consequence of this construction, when the clutch members are separated the spring O moves the thrust-block L out of contact with the shoulder-bearing K, and the parts are so proportioned that the outward thrust of the spring O is insufficient to bring the block L into contact with the adjacent end of the shaft A or the contiguous portion of the clutch member C. It will be noted that the action of the spring is to maintain the clutch-connector in its elongated position.

In order to take up the wear upon the friction-faces, the dogs F and the thrust-collar of the operator are made relatively adjustable. This is effected by making the intermediary between the dogs and the thrust-collar, consisting of the sleeve E, adjustable upon its support, that is to say, upon the hub b of the clutch member D. This adjustment is effected by screwing the sleeve E upon the hub b. To prevent, however, the accidental turning of the sleeve E it is clamped in place when properly adjusted. This clamping is effected by splitting the sleeve E and providing it with clamping-lugs t and bolt w, as shown in Fig. 3.

The modified construction of the clutch shown in Fig. 4 is similar to the preferred construction shown in Figs. 1, 2, and 3, except that in this modification the chamber s, pin N, and spring O are omitted and the relative arrangement of the clutch-sleeve G and dogs F F is different. As shown in Fig. 4, the clutch-collar G slides longitudinally upon the sleeve E, (instead of upon the shaft B,) the sleeve E and hub b of the clutch member D being elongated for this purpose. The clutch-sleeve G has a laterally-extending annular flange P, having an interior coned face e, with which the ends of the dogs F coöperate. The dogs F are constructed so that their outer ends are the upper ends, and they are located within the flange P, with their ends abutting against the cone e. The tie-rods J are sufficiently elongated to correspond with the elongation of the hub b. The operation of this modification is substantially identical with that of the preferred construction. In this modification, as well as in the preferred construction, the dogs F F are, as a matter of essential construction, pivoted to the clutch member D, since the sleeve E is essentially, during the operation of the clutch, a part of the clutch member. It is made separate from the cluctch member for the sake of adjusting for wear and as a convenience in construction and assembling. The clutch-sleeve G hence, in this modification, is properly regarded as sliding upon the clutch member D.

In the modified construction shown in Fig. 5 the shafts A and B, instead of being alined, are concentrically arranged, one surrounding the other, so that the axes of rotation of both shafts are conincident. The hub b of the clutch member D extends in both directions, and where it extends beyond the clutch-face it is made truly circular, so as to constitute the bearing or journal for the shaft A. The shaft A is virtually the same thing as (or an elongation of) the hub a of the clutch member C. The shaft A carries the continually-running driving-pulley Q, which is fast thereto. The dogs F are pivoted directly to the clutch member D, and its heels g abut against the clutch-sleeve E, instead of directly against the thrust-collar H. The sleeve E is fastened to the thrust-collar H. The thrust-collar is connected by the tie-rods J directly with the thrust-block L, instead of indirectly through the intermediate parts I K M of the preferred construction. The thrust-block L coöperates with a shoulder-bearing K, formed, preferably, by the end of the shaft A. The action of the clutch-collar G upon the dogs F hence causes the clutch members to be clutched and unclutched in substantially the same way as in the preferred construction. To compensate for wear upon the clutch-faces, the clutch-sleeve E is longitudinally adjustable upon the thrust-collar H and is clamped in its adjusted position thereupon in exactly the same way as upon the hub b in the preferred construction. The shaft A is, by preference, only just long enough to receive the band-pulley Q, and since it is entirely inclosed by the clutch member D and bearing-block L, special means for lubricating the bearing-surfaces between said shaft A and the hub b are necessary. To this end the outer face of the shaft A, beneath the hub x of the pulley Q, is provided with peripheral oil-channels R, in each of which is located an absorbent S, of felt or other suitable material. Ports y lead from these channels R to the bearing-surfaces, and a supply duct z, or equivalent means, is provided in the hub x for supplying the channels R with oil. Said supply-duct is provided with a screw-plug, as shown, to prevent the escape of oil by centrifugal force. Preferably the peripheral channels R communicate with each other, as shown, so that a single supply-duct suffices.

To minimize wear on the contiguous faces of the parts I K L M, hardened steel washers or disks T are interposed between them, as shown in Figs. 1 and 4. These washers are preferably unattached, or each may be attached to either of the adjacent parts, constituting a hardened steel face therefor.

I claim as my invention—

1. The two clutch members, and their respective shafts, in combination with a thrust-block which coöperates with one of said clutch members, a longitudinally-sliding thrust-collar connected with said thrust-block, said thrust-collar sliding rectilinearly parallel with the axis of rotation of said shafts, and operating devices carried by the other of said clutch members for moving said sliding thrust-collar, substantially as set forth.

2. The two clutch members, and their respective shafts having colinear axes of rotation, in combination with a thrust-block L, which acts upon one of said clutch members, the sliding thrust-collar H, which slides rectilinearly parallel with the axis of rotation of said shafts, the tie-rods connecting said block L, and collar H, said tie-rods extending longitudinally and parallel with the axis of rotation of said shafts and being symmetrically arranged with reference to said axis, and operating-dogs carried by the other of said clutch members which act upon said thrust-collar H, said dogs being outside of said tie-rods, substantially as set forth.

3. The two clutch members, and their respective shafts, in combination with the centrally-located clutch-transmitter, consisting of the two blocks L, and M, connected by the central stem n, the shoulder-bearing K, secured to one clutch member, the sliding disk I, moving within the other clutch member, said stem n extending through said bearing K, and disk I, the sliding thrust-collar H, the tie-rods J, directly connecting said disk I and thrust-collar H, and means carried by the other of said clutch members for actuating said thrust-collar H, substantially as set forth.

4. The two alined shafts, and the two clutch members secured respectively thereto, in combination with the centrally-located stem in line with and between said two shafts, said stem being movable longitudinally, said stem having means for operatively connecting it with one of said shafts or the clutch member thereof, and means carried by the other of said shafts or the clutch member thereof for moving said centrally-located stem, substantially as set forth.

5. The two alined shafts, and the two clutch members secured respectively thereto, in combination with the centrally-located clutch-transmitter in line with and between the adjacent ends of said two shafts, said clutch-transmitter having means for frictionally connecting it with one of said shafts or the clutch member thereof, and means carried by the other of said shafts or the clutch member thereof for moving said centrally-located clutch-transmitter, substantially as set forth.

6. The two clutch members, and their respective shafts, in combination with a plurality of longitudinally-extending equally-spaced tie-rods arranged symmetrically with reference to and parallel with the common axis of said shafts, said tie-rods connecting the clutch-operating mechanism with the immediate clutching instrumentality, and each of said tie-rods being capable of a rectilinear movement only parallel with said common axis, substantially as set forth.

7. The two clutch members, in combination with the clutch-connector composed of two members or sections sliding one upon the other and having abutting parts which are brought together and separated by said sliding movement, one of said sections being operatively connected with one of said clutch members, and means connected with the other of said clutch members for moving the other of said clutch-connector sections longitudinally, whereby when said abutting parts of said connector-sections are brought together said clutch members are brought together, substantially as set forth.

8. The two clutch members, in combination with the clutch-connector composed of two members or sections having a rotary movement one upon the other and having abutting parts so that the longitudinal movement of one section may move the other section longitudinally, one of said sections being operatively connected with one of said clutch members, and means connected with the other of said clutch members for moving the other of said clutch-connector sections longitudinally, whereby said clutch members are brought together, substantially as set forth.

9. The two clutch members, in combination with the clutch-connector composed of two members or sections one sliding and having a rotary movement upon the other, said movements being independent of each other, said sections having abutting parts which are brought together and separated by said sliding movements, one of said sections being operatively connected with one of said clutch members, and means connected with the other of said clutch members for moving the other of said clutch-connector sections longitudinally, whereby when said abutting parts of said connector-sections are brought together said clutch members are brought together, substantially as set forth.

10. The two clutch members, and their respective members, in combination with a clutch-connector composed of an operator and a transmitter slidingly and rotatively connected together, the sliding and rotation being independent of each other, said operator and transmitter having abutting parts which limit the relative sliding movement between the same so that said abutting parts are brought together by the longitudinal movement of said operator, said operator being operatively connected with one of said clutch members, said transmitter being operatively connected with the other of said clutch members, and means connected with the latter of said clutch members for moving said transmitter longitudinally, substantially as set forth.

11. The two clutch members C and D each having a plurality of concentric angular-shaped grooves on its face, and the two alined shafts carrying said clutch members respectively, in combination with the clutch-transmitter located between the adjacent ends of said shafts and in axial alinement therewith, said clutch-transmitter being composed of the central stem n, having at opposite ends the thrust-block L, and the bearing-block M, the bearing-shoulder K, fixed to the clutch member C, having a central aperture through which the said stem $n$ loosely extends, the sliding disk I, fitting and sliding within the clutch member D, said disk having a central guide-aperture through which said stem $n$ slides with a guiding fit, the sliding thrust-collar H, the tie-rods J, extending through the hub of the clutch member D, and connecting said sliding disk I and thrust-collar H, and the sleeve E, secured to the clutch member D, the dogs F pivoted to said sleeve and having heels $g$ which abut against said thrust-collar H, and the sliding clutch-sleeve G, having a coned end which acts upon the free ends of said dogs, F, substantially as set forth.

12. The combination of the two clutch members, the thrust-collar adapted to communicate movement to one of said clutch members, the dogs, which are connected with the other of said clutch members, and the sleeve E, said dogs and thrust-collar being relatively adjustable by the adjustment of said sleeve upon its support, substantially as set forth.

13. The combination of the two clutch members, the thrust-collar adapted to communicate movement to one of said clutch members, the dogs, which are connected with the other of said clutch members, and the sleeve E, said dogs and thrust-collar being relatively adjustable by the adjustment of said sleeve upon its support, said sleeve screwing upon its support, and being formed as a split ring or nut with clamping devices for clamping it in its adjusted position upon its support, substantially as set forth.

14. The clutch member, the sleeve E, adjustable thereupon, the second clutch member, and the sliding thrust-collar H, which is adapted to communicate motion to said second clutch member, in combination with the dogs F, pivoted to the said sleeve E, and co-operating with said collar H, substantially as set forth.

15. The two-part clutch-connector in combination with a spring which tends to maintain said connector in its elongated position, the two shafts, and the two clutch members carried by said shafts respectively, substantially as set forth.

16. The clutch-connector, in combination with the pin N, and spring O, the two shafts, and the two clutch members carried by said shafts respectively, substantially as set forth.

17. The two clutch members, their respective alined shafts, and the shoulder-bearing K, in combination with the clutch-connector having central chamber $s$, the pin N, sliding in said chamber $s$, and the spring O, substantially as set forth.

18. The clutch member, and the clutch-sleeve sliding thereupon, said clutch-sleeve having a projecting annular flange coned on its inner side, in combination with dogs pivoted to said clutch member and having their upper free ends abutting against said coned inner side of said flange, substantially as set forth.

In witness whereof I have hereunto signed my name in the presence of two subscribing witnesses.

WILLIAM ESTY.

Witnesses:
 ORRAN W. TIBBETTS,
 WILLIAM F. KNIGHT.